US006725942B2

(12) United States Patent
Stevens

(10) Patent No.: US 6,725,942 B2
(45) Date of Patent: Apr. 27, 2004

(54) PULVERIZER

(76) Inventor: Timothy J. Stevens, 145 8$^{th}$ St. SW., Buffalo, MN (US) 55313

( * ) Notice: Subject to any disclaimer, the term of this patent is extended or adjusted under 35 U.S.C. 154(b) by 0 days.

(21) Appl. No.: 10/230,020

(22) Filed: Aug. 28, 2002

(65) Prior Publication Data

US 2004/0050562 A1 Mar. 18, 2004

(51) Int. Cl.$^7$ ............................................... A01B 33/04
(52) U.S. Cl. ...................... 172/40; 37/142.5; 172/118
(58) Field of Search .......................... 37/142.5; 172/40, 172/817, 32, 118–123

(56) References Cited

U.S. PATENT DOCUMENTS

| | | | | |
|---|---|---|---|---|
| 4,664,791 A | * | 5/1987 | McClain et al. ............ 209/421 |
| 4,749,048 A | | 6/1988 | Kelly |
| 4,924,945 A | | 5/1990 | Mork |
| 5,084,991 A | * | 2/1992 | Cronk, Jr. .................. 37/142.5 |
| 5,111,645 A | * | 5/1992 | Klinner ........................ 56/364 |
| D335,131 S | | 4/1993 | Devaney |
| 5,211,247 A | | 5/1993 | Johnsen |
| 5,271,470 A | * | 12/1993 | King et al. .................... 172/40 |
| D358,401 S | | 5/1995 | Devaney |
| 5,493,796 A | * | 2/1996 | Ballew et al. ............. 37/142.5 |
| 5,743,030 A | * | 4/1998 | Sirr ............................... 37/406 |
| 6,035,562 A | | 3/2000 | Virnig et al. |
| 2002/0044828 A1 | * | 4/2002 | Olynyk ........................ 404/72 |

FOREIGN PATENT DOCUMENTS

| | | | | |
|---|---|---|---|---|
| DE | 4327426 A1 | * | 2/1995 | ............. E02F/5/12 |
| GB | 2219330 A | * | 12/1989 | ............. E02F/5/22 |

* cited by examiner

Primary Examiner—Thomas B. Will
Assistant Examiner—Alexander K. Pechhold

(57) ABSTRACT

A pulverizer for reducing the clumpiness or aggregation of soil into clumps or clods and for screening materials, the pulverizer having a frame mounting a substantially cylindrically configured screening drum for rotation and a scoop for aiding the delivery of the material to be pulverized or screened to the screening drum. The pulverizer may be mounted as an attachment onto an appropriate power source such as a tractor or a skid-steer loader.

7 Claims, 5 Drawing Sheets

PULVERIZER

The present invention relates to apparatus for reducing the number and size of clumps or clods or other aggregations of earthen material or for screening granular or aggregate material and in particular to such an apparatus that is attached to a skid-steer loader or other power source such as a tractor.

BACKGROUND OF THE INVENTION

Landscapers typically smoothly contour the ground surface before laying sod or planting bushes or flowers. Nutrient rich earth is the preferred base for such a use and where such soil does not exist at a particular site, it is often times transported there from a seller, such as a garden nursery.

To be readily and easily usable, especially by a home owner using hand tools to distribute contour, and landscape the soil bed, it is preferred that the soil, whether utilized from on-site supplies or delivered from a seller, is available for use without significant clumping or aggregation of the earthen material into clods. As anyone who has worked soil where large numbers of clods are found can attest, the presence of clods contributes to either extra work to reduce them or to an uneven surface. If left alone, large dirt clumps or clods may tend to disintegrate over time, but in doing so they leave a small pile rather than the desired even surface. Where soil is purchased from a seller, then, delivery without significant amounts of clods is required to minimize reworking of the soil at the site.

Compacted and aggregated soils affect not only garden nurseries, but also landscapers, construction companies, trenching companies, or anyone else that disturbs a site and must refinish it. For example, during construction of a new home, new topsoil may not be brought in from off site because the existing top soil may be adequate for the desired lawn and garden uses. During the actual construction, however, the topsoil may be cleared and piled for later replacement. As the soil sits in the pile, it can accumulate moisture and compact or aggregate into clods, resulting in clumps that require considerable reworking after replacement. Trenchers will also disturb the top soil layer, requiring replacement. Once again, a smoothly contoured surface is desirable before laying new sod or seeding.

To address this problem of soil clumps, soil pulverizers have been constructed to reduce soil "lumpiness". Typically, these devices comprise rotating screening drums into which the soil is placed by another machine. These pulverizers are typically rather large and are designed to process significant amounts of soil at one time. Purchase and operation of such large scale pulverizers is therefore cost prohibitive for many, if not most, landscapers and soil retailers such as nurseries. Consequently, retailers such as garden nurseries tend to rent pulverizers on a short-term basis to process the soil in inventory while landscapers or construction companies may do the same to process soils used on-site. This processing may have to be done on a repeated and regular basis because even though once processed, as the newly pulverized and piled soil sits it absorbs moisture and once again clods can form. Pulverizing soil, then, is a continuing cost item for operators that do finish landscape work. Failing to pulverize the soil may result in the operation incurring additional labor and machine costs to achieve the desired soil bed contours while the present day pulverizing methods typically require bringing in the aforementioned large-scale pulverizers at additional cost.

It would be desirable to have a pulverizer that was economical to purchase and to use, that would readily process soil to reduce clumps; that provided the operator with the ability to readily change pulverizer screens; and that was easily transportable.

BRIEF DESCRIPTION OF THE INVENTION

It is an object of the present invention to provide apparatus that is not subject to the foregoing disadvantages.

It is an object of the present invention to provide apparatus for pulverizing material and screening the same.

It is another object of the present invention to provide apparatus for pulverizing soil clods and clumps and screening material that is cost effective for small businesses to own and operate.

It is still another object of the present invention to provide apparatus for pulverizing soil clods and clumps that is mountable to a skid-steer loader, tractor or other machinery.

The present invention provides a soil pulverizer for reducing the dumpiness or aggregation of soil into clumps or clods. In an embodiment of the present invention, the pulverizer may be mounted as an attachment onto an appropriate power source such as a tractor or a skid-steer loader. A pulverizer in accord with the present invention has a frame mounting a substantially cylindrically configured screening drum for rotation. The frame has a mounting bracket for attaching the pulverizer to the power source. The frame preferably mounts a protective shell or housing that partially encloses the screening drum. The frame may mount an attached scoop to the front thereof to facilitate guiding soil into the screening drum when attached to the tractor or loader. That is, the scoop may be pushed into a pile of dirt to push dirt into the screening drum.

A screening drum according to an embodiment of the present invention includes a cylindrical screen mounted to a shaft for rotation about the shaft longitudinal axis. The rear end of the shaft includes an attachment head having a recess configured to be attached to a drive shaft from a hydraulic motor or other appropriate power source. In the present embodiment illustrated herein, the attachment head includes a recess to receive non-rotationally the end of a power source drive shaft. To facilitate mounting the screening drum within the housing the scoop may include a slot to allow the forward end of the drum drive shaft to pass through.

The foregoing objects of the present invention will be fully understood and appreciated by those skilled in the art upon reading the present description in conjunction with the attached drawings illustrating an embodiment of the present invention.

DETAILED DESCRIPTION OF THE INVENTION

Figure 1:
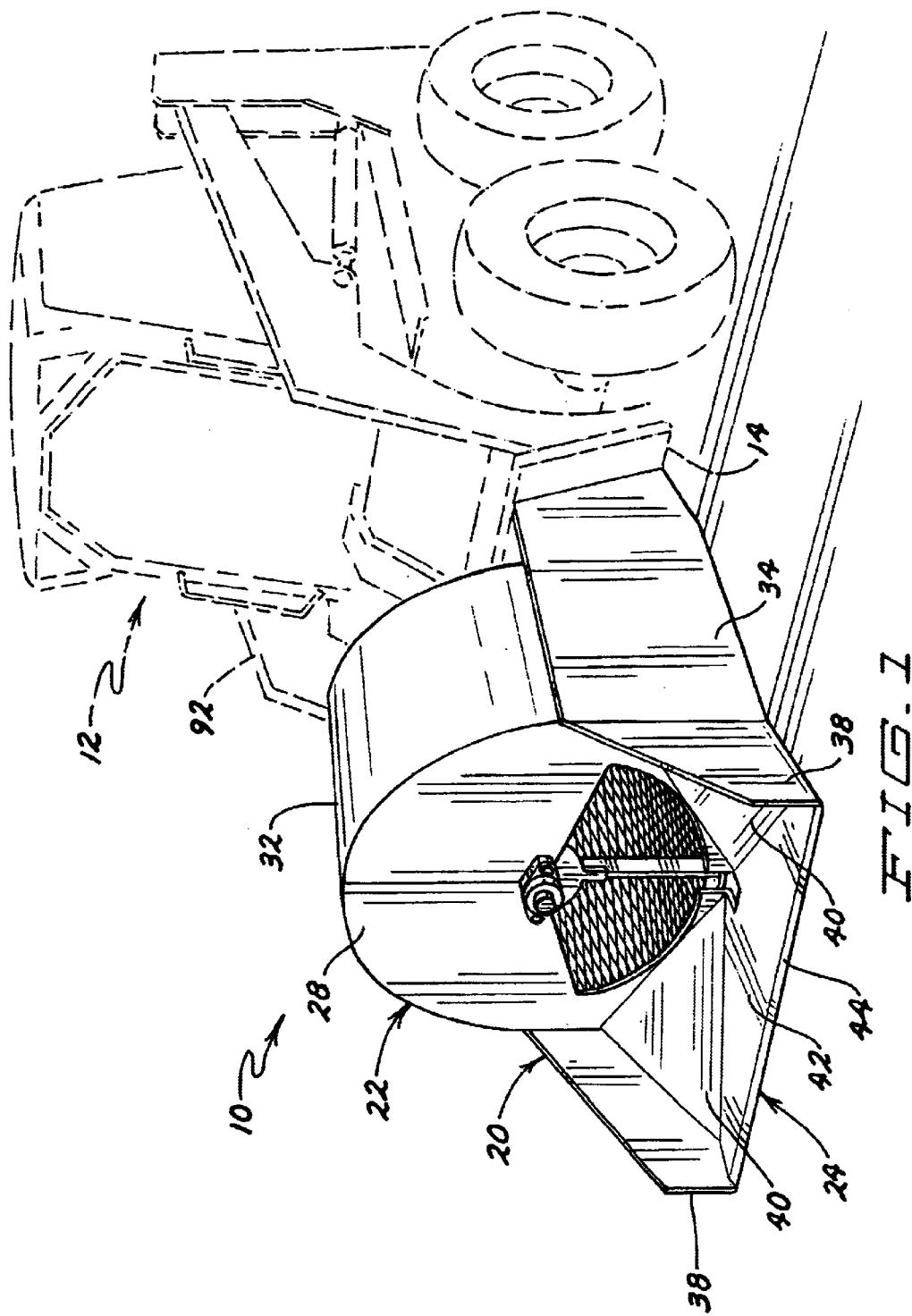
FIG. 1 is a perspective view of the present invention showing it attached to the front end of a skid-steer loader, which is shown in phantom outline.

An exemplary embodiment 10 of a pulverizer in accord with the present invention is shown in FIGS. 1–7D and described hereafter. Pulverizer 10 is shown removably attached to a skid-steer loader 12, shown in phantom outline. Pulverizer 10 includes a common attachment bracket 14 used to mount such equipment on such loader-type devices, but could be modified for attachment to a three-point tractor hitch found on typical farm tractors or any other desired equipment.

Pulverizer 10 includes a frame 20 comprising a screening drum housing 22 and a scoop 24. Frame 20 is attached to the attachment bracket 14. Housing 22 has a substantially semi-cylindrical, hollow configuration to receive a screening drum 26.

Housing 22 includes front and rear sides 28 and 30, and a partial, cylindrical shell 32 that extends upwardly from side panels 34. Housing 22 includes an opening 36 at the bottom thereof to accommodate the insertion of the screening drum 26 into the interior of housing 22, as will be more fully described below, best seen in FIG. 3.

Scoop 24 can adopt many configurations within the scope of the present invention. As shown, the scoop in the embodiment of the present invention is formed by forwardly projecting side panel portions 38, which extend substantially parallel to each other and substantially vertically, corner plates 40, and blade portion 42. Blade portion 42 includes a beveled blade 44. The corner plates 40 are triangularly configured and extend between the side panel portion 38 along one edge, the blade portion 42 along a second edge, and the front side 28 of the housing 22 along the third edge. As noted, the scoop 24 can take other embodiments and could comprise a unitary configured member. Scoop 24 is provided to aid in presenting dirt to the screening drum 26 through the opening 46 of the front side 28 of housing 22.

Screening drum 26 as shown in the illustrated embodiment of the present invention comprises a pair of support rings 50 that extend circumferentially and a plurality of supporting spokes 52 that extend radially between the rings and a screening drum shaft 54. A screen 56 having the appropriately sized screening openings 58 is attached to the rings 50. Screen 56 can be manufactured as a rectangular piece and then rolled around the support rings and attached thereto in a known manner. While the present invention is illustrated with a cylindrical screen, it will be readily observed that other regular geometrical figures could also be used for the screening drum 26.

Figure 2:
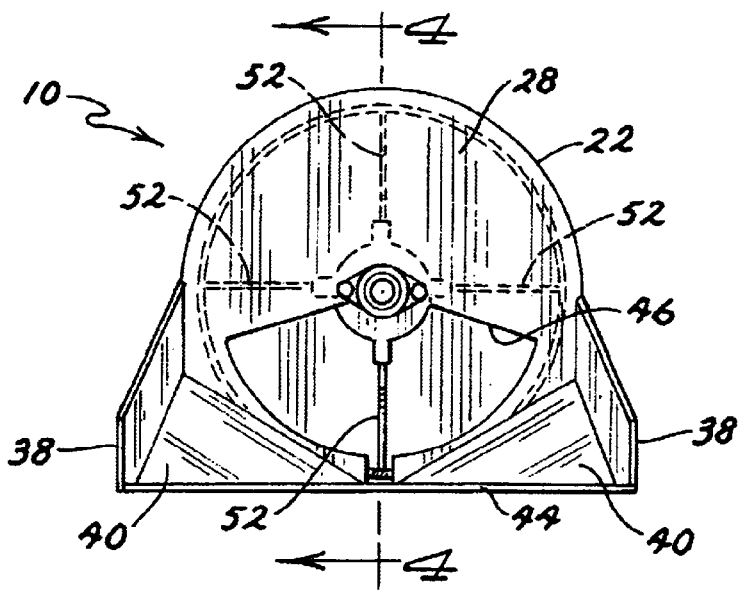
FIG. 2 shows the present invention in a front elevation view.
Figure 3:
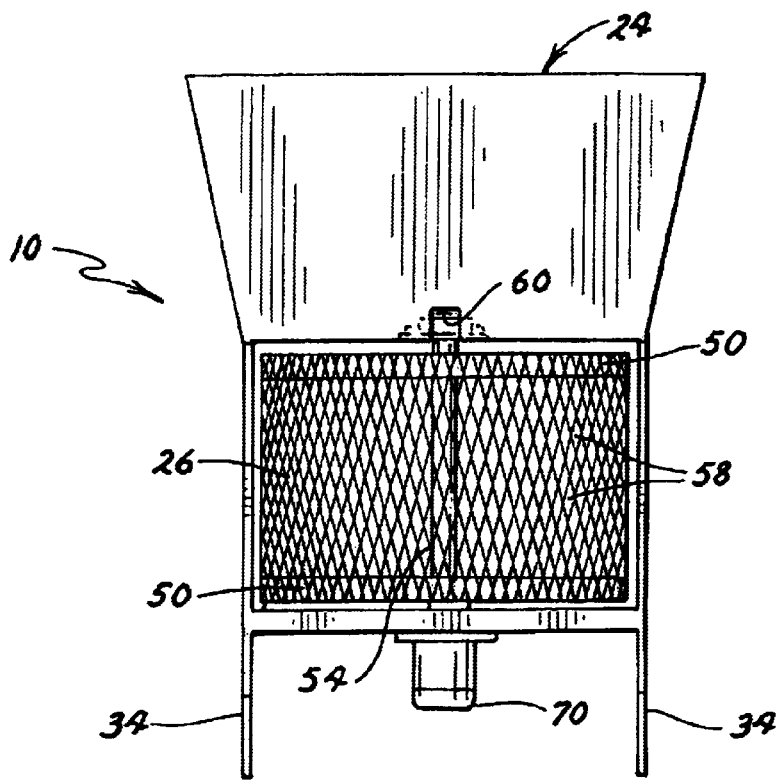
FIG. 3 depicts the present invention in a bottom plan view.
Figure 4:
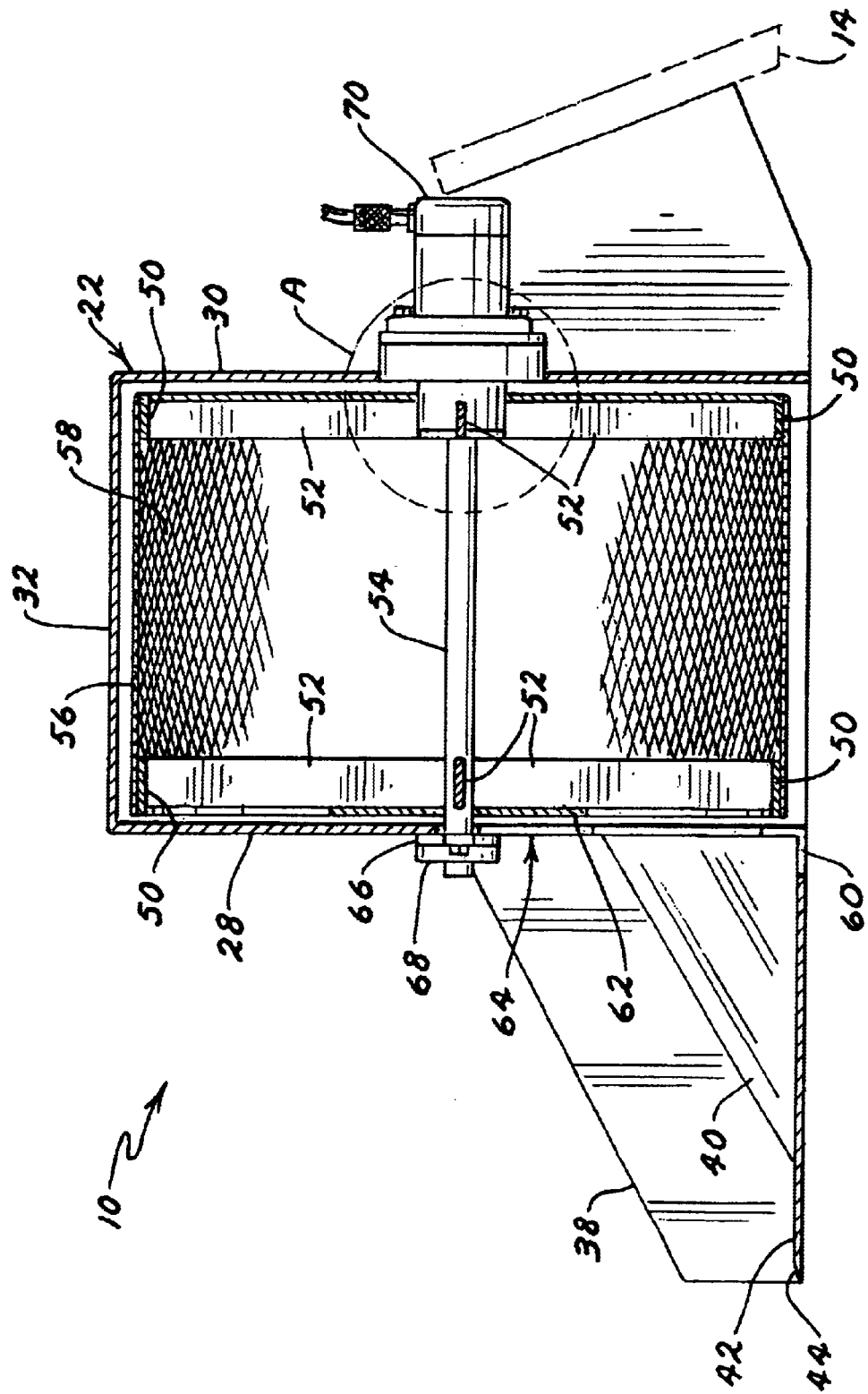
FIG. 4 illustrates the present invention is a side elevation, cross sectional view taken along viewing plane 4—4 of FIG. 2.

To aid in the ready insertion of the screening drum 26 into the housing 22, it will be observed that scoop 24 advantageously includes a slot 60 to accommodate the shaft 54. It will be observed from FIG. 4 that shaft 54 is longer than the length of the housing 22. Thus, without the slot 60 in the scoop 24, it would be difficult if not impossible to insert the drum 26 into the housing 22. Referring to FIGS. 2 and 4 particularly, it will be observed that the shaft 24 engages a shaft retention plate 62 attached to the spokes 52 at the front end 64 of the drum 26. The front end of the shaft 54 includes a mounting plate 66 that is used to attach the screening drum to the front side 28 of the housing 22. Mounting plate 66 includes an appropriate bearing 68 through which the shaft 54 extends.

The screening drum 26 is rotated by a motor 70, attached in any known way to the rear side of the housing 22. As illustrated, the motor 70 is a hydraulic motor operating in conjunction with the hydraulic system of the loader 12. Alternatively, motor 70 could be an electric motor operated off an electrical system or some other mechanical motor that would provide rotation to the drum 26. Preferably, motor 70 is removably attached to the housing 22 to facilitate exchanges in the case of motor failure or some other need.

Figure 6:
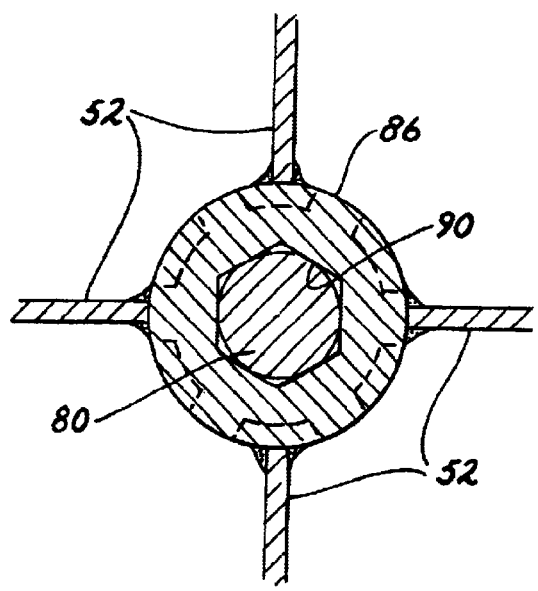
FIG. 6 illustrates the attachment of the screening drum shaft and the hydraulic motor in a cross sectional view taken along viewing plane 6—6 of FIG. 5.
Figure 5:
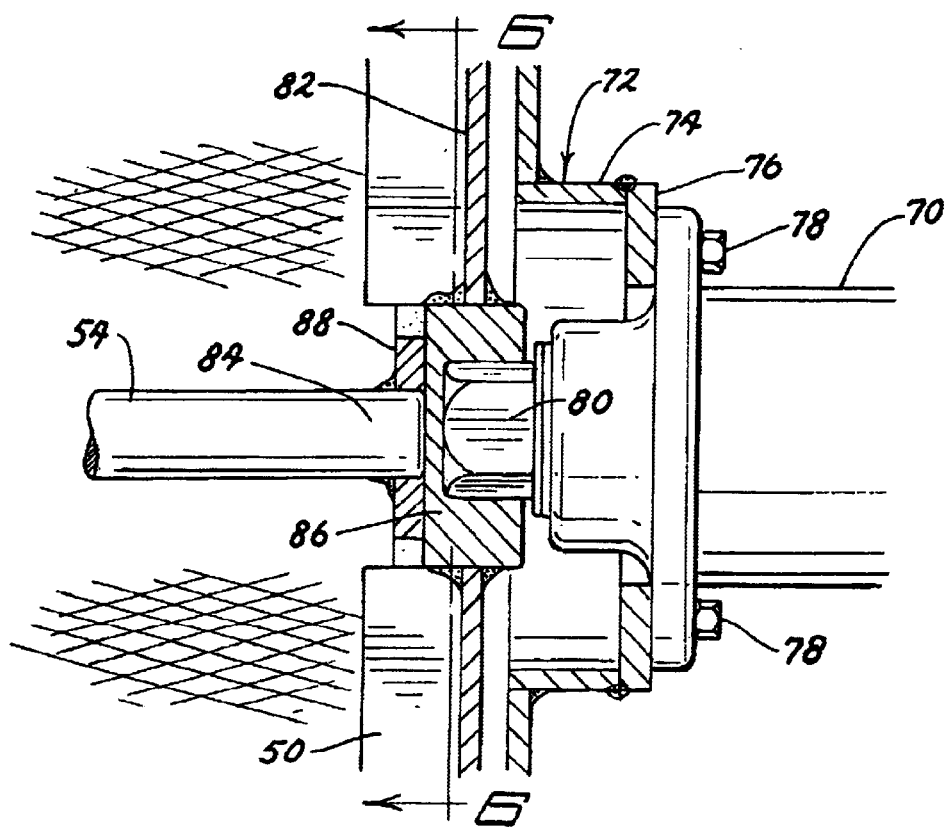
FIG. 5 shows that portion of FIG. 4 indicated by the circle "A" in greater detail.

Referring particularly now to FIGS. 4–6, the rotational engagement between the shaft 54 and motor 70 will now be described in further detail. It will be observed that the present embodiment includes a motor mounting box 72 attached to the rear side 30 of the housing 22. As illustrated, the mounting box comprises a cylindrical side surface 74 and a flat rear surface 76 to which the motor 70 is shown attached by bolts 78. While the present embodiment includes a cylindrically configured mounting box, the present invention is not so limited and could readily include other configurations.

A motor drive shaft 80 extends from the motor 70 into a driving engagement with the screening drum 26. It will be observed that the rear side 82 of the screening drum 26 preferably comprises a solid surface to prevent the material being pulverized or screened from falling out the back side and thus not being screened or pulverized.

The rear end 84 of the shaft 54 is attached to an Allen-type head 86. A support plate 88 is preferably attached to the head 86 and the shaft 54 to stabilize the attachment therebetween. The head 86 is also attached to the rear side 82 of the drum 26. Head 86 includes a non-circular recess 90 configured to receive relatively non-rotationally therein the appropriately configured motor drive shaft 80. As shown, the motor drive 80 and the shaft recess 90 each have a regular six-sided or hexagonal configuration, though other configurations could also be used.

To mount the screening drum within the housing 22, then, the rear end of the screening drum is first inserted into the housing such that the recess 90 engages the shaft 80. The front end of the screening drum 26 can then be appropriately positioned so as to attach it to the front side 28 of the housing using the mounting plate 66. In doing so, the forward end of the shaft 54 must pass through the appropriately provided slot 60.

It will be understood that the present construction of the pulverizer 10 enables the user to obtain and use screening drums with screening apertures of differing sizes and configurations. This enables the user to readily change out the screening drum for different operations, such as soil pulverization or screening of aggregate or granular material.

Figure 7A:
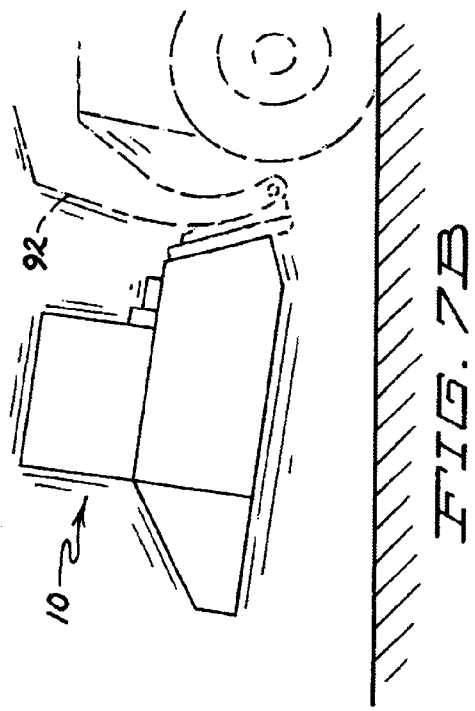
FIGS. 7A–7D depict the present invention in operation.
Figure 7B:
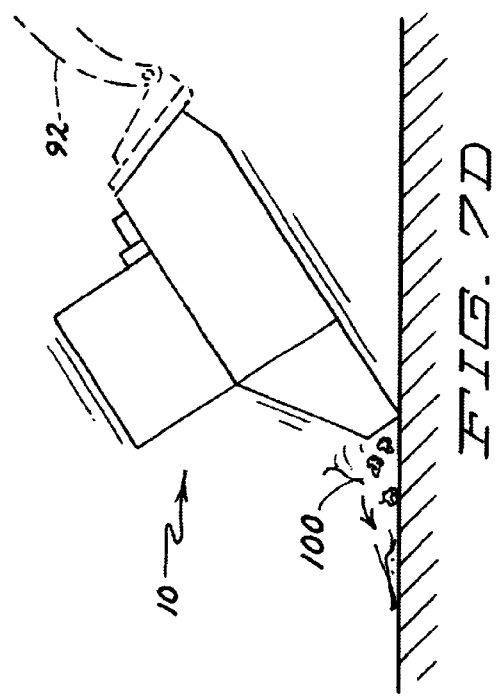

With the construction of the pulverizer 10 described generally above, the operation of the present invention will now be described with reference to FIGS. 7A–7D. It will be observed with respect to FIG. 7A that the loader 12 has a pulverizer 10 in accord with the present invention attached thereto. The pulverizer 10 is attached to the hydraulic tool arms 92 of the loader 12. Arms 92, as is well known with such loaders, can be raised and lowered. Loader 12 is being used to push the pulverizer 10 into a pile 94 of material to be processed. In doing so, the blade 44 slices into the pile and the material is forced rearwardly onto the scoop 24 and into the drum 26. Once the appropriate amount of material has been placed within the pulverizer and onto the scoop, the arms 92 of the loader will be raised to elevate the pulverizer 10 to the appropriate height as seen in FIG. 7B. Raising the arms to tilt the pulverizer such that the front end is higher than the rear end will aid in the flow of material rearwardly into the drum 26.

Figure 7C:
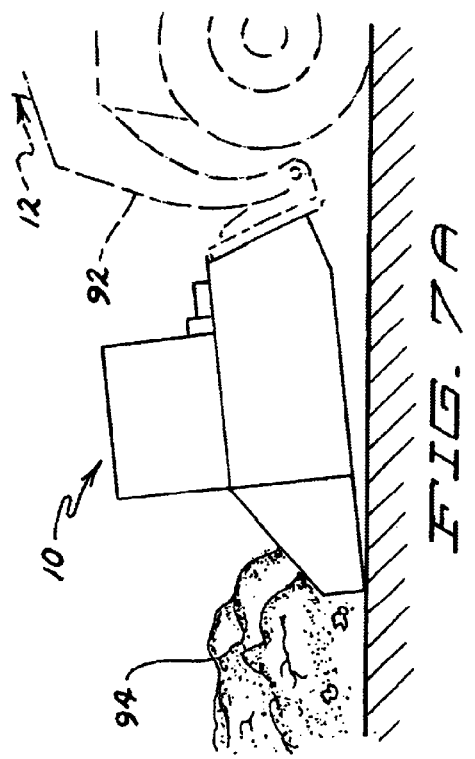

As shown in FIG. 7C, the pulverizer can be held level an appropriate distance above the ground and the motor 70 can be activated to start rotation of the drum 26. The tumbling action of the material inside the drum 26 will result in the pulverization of the clods of materials and will also screen out undesirable material such as sticks or rocks sized in excess of the screen openings 58. As seen in the Figure, the pulverized material 96 empties out of the screening drum 26 through the screen openings 58 to form a new pile of material 98.

Figure 7D:
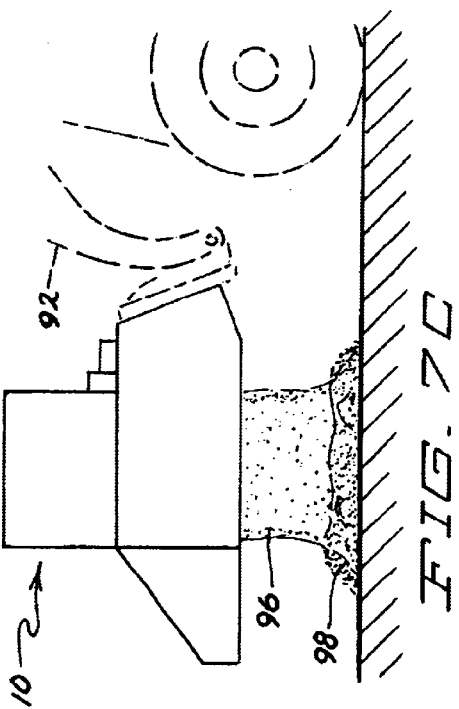

Referring now to FIG. 7D, once the desired amount of pulverization has occurred, the pulverizer 10 can be positioned with the arms 92 such that the rear end thereof is substantially higher than the front end and any oversized material can be emptied out of the drum 26 into a separate pile 100 to be handled later as desired. If desired, the drum rotation can continue during this stage to aid in emptying the drum 26 or it can be discontinued.

The present invention thus provides apparatus and method for pulverizing dirt clods or clumps and screening undesirable material from desired materials. The present invention can be manufactured for substantially less cost that presently available devices, thus making them readily affordable for a large number of potential users. It also presents the advantage over known prior art devices in that it can scoop up a load of dirt, then be moved to a desired dumping spot and the loaded soil can then be processed.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. A pulverizer for reducing the size of aggregated soil clumps, said pulverizer comprising:
    a frame;
    a scoop attached to said frame; and
    a screening drum mounted for rotation by said frame; wherein
        said frame includes a semi-cylindrical housing for mounting said drum, said housing including an opening in the lower portion thereof to allow pulverized soil to flow out of said pulverizer;
        said scoop is provided for scooping up soil and depositing it in said screening drum; and said screening drum includes:
        a circumferentially extending screen;
        at least one circumferentially extending support ring for supporting said screen;
        a shaft; and
        a plurality of support ribs extending between said at least one support ring and said shaft for supporting said screen and said at least one support ring radially away from said shaft.

2. The pulverizer of claim 1 wherein said housing includes a front surface, said surface including an opening in the lower portion thereof adjacent to said scoop to allow soil to be placed into said screening drum.

3. The pulverizer of claim 1 wherein:
    said housing includes a front surface, said scoop being attached to said frame adjacent to said front surface, said front surface including an opening in the lower portion thereof adjacent to said scoop to allow soil to be scooped up by said scoop and deposited into said screening drum; and
    said shaft includes front and rear ends, said shaft front end being rotationally mounted to said front surface.

4. The pulverizer of claim 3 and further including means for rotating said shaft and wherein said shaft rear end includes means for engaging said rotating means.

5. The pulverizer of claim 1 and further including means for rotating said shaft and wherein:
    said housing includes a front surface, said scoop being attached to said frame adjacent to said front surface, said front surface including an opening in the lower portion thereof adjacent to said scoop to allow soil to be scooped by said scoop and deposited into said screening drum; and
    said shaft includes front and rear ends, said shaft rear end of said shaft including means for engaging said rotating means.

6. The pulverizer of claim 1 and further including an hydraulic motor for rotating said shaft, said hydraulic motor including a drive shaft having a non-circular cross-section, and wherein said shaft includes front and rear ends, said shaft rear end of said shaft including a socket for engaging said motor drive shaft.

7. The pulverizer of claim 1 wherein said shaft has a length greater than the length of said housing and wherein said scoop includes a slot, said slot being provided to accommodate the length of said shaft when said screening drum is mounted in said housing.

\* \* \* \* \*

UNITED STATES PATENT AND TRADEMARK OFFICE
CERTIFICATE OF CORRECTION

PATENT NO. : 6,725,942 B2
DATED : April 27, 2004
INVENTOR(S) : Stevens, Timothy J.

It is certified that error appears in the above-identified patent and that said Letters Patent is hereby corrected as shown below:

Column 1,
Line 45, "lumpiness" should read as -- clumpiness --

Column 2,
Line 19, "dumpiness" should read as -- clumpiness --

Signed and Sealed this

Sixth Day of July, 2004

JON W. DUDAS
*Acting Director of the United States Patent and Trademark Office*